US012596650B2

(12) United States Patent (10) Patent No.: US 12,596,650 B2
Werner et al. (45) Date of Patent: Apr. 7, 2026

(54) PREEMPTIVE FLUSHING OF PROCESSING-IN-MEMORY DATA STRUCTURES

(71) Applicant: Advanced Micro Devices, Inc., Santa Clara, CA (US)

(72) Inventors: David Andrew Werner, Austin, TX (US); Travis Henry Boraten, Austin, TX (US); Michael Warren Boyer, Redmond, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 18/375,018

(22) Filed: Sep. 29, 2023

(65) Prior Publication Data

US 2025/0110887 A1 Apr. 3, 2025

(51) Int. Cl.
*G06F 12/00* (2006.01)
*G06F 12/0891* (2016.01)
*G06F 12/0897* (2016.01)

(52) U.S. Cl.
CPC ...... *G06F 12/0897* (2013.01); *G06F 12/0891* (2013.01); *G06F 2212/1021* (2013.01)

(58) Field of Classification Search
CPC .............. G06F 12/0897; G06F 12/0891; G06F 12/1021; G06F 2212/1021
See application file for complete search history.

(56) References Cited

U.S. PATENT DOCUMENTS

| | | | |
|---|---|---|---|
| 6,263,406 B1 | 7/2001 | Uwano | |
| 6,553,465 B1 | 4/2003 | Takusagawa | |
| 6,560,693 B1 | 5/2003 | Puzak et al. | |
| 6,944,746 B2 | 9/2005 | So | |
| 7,047,393 B2 | 5/2006 | Paver | |
| 8,359,462 B1 | 1/2013 | Khan et al. | |
| 9,575,815 B1 | 2/2017 | Guthrie et al. | |
| 10,061,588 B2 | 8/2018 | Gschwind et al. | |
| 11,119,923 B2 | 9/2021 | Farmahini Farahani et al. | |

(Continued)

FOREIGN PATENT DOCUMENTS

WO WO-2022046371 3/2022

OTHER PUBLICATIONS

"x86 Instruction Set Reference: CLFLUSH", Retrieved Jan. 24, 2024. Retrieved from the Internet <https://c9x.me/x86/html/file_module_x86_id_30.html>, 2 pages.

(Continued)

*Primary Examiner* — Craig S Goldschmidt

(74) *Attorney, Agent, or Firm* — FIG. 1 Patents

(57) ABSTRACT

Preemptive flushing of data involved in executing a processing-in-memory command, from a cache system to main memory that is accessible by a processing-in-memory component, is described. In one example, a system includes an asynchronous flush controller that receives an indication of a subsequent processing-in-memory command to be executed as part of performing a computational task. While earlier commands of the computational task are executed, the asynchronous flush controller evicts or invalidates data elements involved in executing the subsequent processing-in-memory command from the cache system, such that the processing-in-memory command can proceed without stalling.

20 Claims, 5 Drawing Sheets

(56) References Cited

U.S. PATENT DOCUMENTS

| | | | |
|---|---|---|---|
| 11,487,447 | B2 | 11/2022 | Islam et al. |
| 11,594,274 | B2 | 2/2023 | Murphy et al. |
| 11,625,249 | B2 | 4/2023 | Kotra et al. |
| 11,625,251 | B1 | 4/2023 | Agrawal et al. |
| 11,663,008 | B2 | 5/2023 | Lee et al. |
| 11,782,624 | B2 | 10/2023 | Yang et al. |
| 11,797,201 | B2 | 10/2023 | Islam et al. |
| 11,868,777 | B2 | 1/2024 | Kalamatianos et al. |
| 12,032,829 | B2 | 7/2024 | Kim et al. |
| 12,073,251 | B2 | 8/2024 | Challapalle et al. |
| 12,153,926 | B2 | 11/2024 | Kalamatianos et al. |
| 12,160,643 | B2 | 12/2024 | Zhou et al. |
| 12,265,470 | B1 | 4/2025 | Boraten et al. |
| 12,380,029 | B2 | 8/2025 | Boraten et al. |
| 12,455,826 | B2 | 10/2025 | Werner et al. |
| 2002/0199066 | A1 | 12/2002 | Chaudhry et al. |
| 2006/0101209 | A1 | 5/2006 | Lais et al. |
| 2006/0224835 | A1 | 10/2006 | Blumrich et al. |
| 2007/0174685 | A1 | 7/2007 | Banks |
| 2008/0046692 | A1 | 2/2008 | Michalak et al. |
| 2008/0244185 | A1 | 10/2008 | O'Krafka et al. |
| 2008/0307169 | A1 | 12/2008 | Averill et al. |
| 2009/0313435 | A1 | 12/2009 | Thantry et al. |
| 2010/0017649 | A1 | 1/2010 | Wu et al. |
| 2010/0153761 | A1 | 6/2010 | Nishioka |
| 2011/0242113 | A1 | 10/2011 | Keall et al. |
| 2011/0276762 | A1 | 11/2011 | Daly et al. |
| 2012/0069664 | A1 | 3/2012 | Kim et al. |
| 2012/0159080 | A1 | 6/2012 | Donley et al. |
| 2012/0179876 | A1 | 7/2012 | Guthrie et al. |
| 2012/0246395 | A1 | 9/2012 | Cho et al. |
| 2013/0086367 | A1 | 4/2013 | Gschwind et al. |
| 2014/0040551 | A1 | 2/2014 | Blainey et al. |
| 2014/0052916 | A1 | 2/2014 | Lih et al. |
| 2014/0089572 | A1 | 3/2014 | Koka et al. |
| 2014/0281405 | A1 | 9/2014 | Streett et al. |
| 2016/0092238 | A1 | 3/2016 | Codrescu et al. |
| 2016/0098279 | A1 | 4/2016 | Glew |
| 2016/0155491 | A1 | 6/2016 | Roberts et al. |
| 2017/0060588 | A1 | 3/2017 | Choi |
| 2017/0123915 | A1 | 5/2017 | Nguyen et al. |
| 2017/0123987 | A1 | 5/2017 | Cheng et al. |
| 2017/0213312 | A1 | 7/2017 | Woo et al. |
| 2017/0262369 | A1 | 9/2017 | Murphy |
| 2017/0337136 | A1 | 11/2017 | Basu et al. |
| 2017/0344479 | A1 | 11/2017 | Boyer et al. |
| 2017/0344480 | A1 | 11/2017 | Beard et al. |
| 2018/0074958 | A1 | 3/2018 | Jayasena et al. |
| 2018/0089081 | A1 | 3/2018 | Ramalingam |
| 2018/0188961 | A1 | 7/2018 | Venkatesh et al. |
| 2018/0336035 | A1 | 11/2018 | Choi et al. |
| 2019/0018786 | A1 | 1/2019 | Beard et al. |
| 2019/0089081 | A1 | 3/2019 | Zhang |
| 2020/0192757 | A1 | 6/2020 | Qin et al. |
| 2020/0218540 | A1 | 7/2020 | Kesiraju et al. |
| 2021/0271599 | A1 | 9/2021 | Sharovar |
| 2021/0271680 | A1 | 9/2021 | Lee et al. |
| 2022/0075713 | A1 | 3/2022 | Yoon et al. |
| 2022/0076717 | A1 | 3/2022 | Mathew et al. |
| 2022/0188117 | A1 | 6/2022 | Kalamatianos et al. |
| 2022/0188233 | A1* | 6/2022 | Kalamatianos ..... G06F 12/0828 |
| 2022/0197814 | A1 | 6/2022 | Yudanov |
| 2022/0206817 | A1 | 6/2022 | Kotra et al. |
| 2022/0206855 | A1 | 6/2022 | Challapalle et al. |
| 2022/0206950 | A1 | 6/2022 | Ghodrat et al. |
| 2022/0276795 | A1 | 9/2022 | Islam et al. |
| 2023/0066662 | A1 | 3/2023 | Park |
| 2023/0137467 | A1 | 5/2023 | Moyer |
| 2023/0244442 | A1 | 8/2023 | Lee et al. |
| 2023/0244492 | A1 | 8/2023 | Kotra et al. |
| 2023/0418474 | A1 | 12/2023 | Kim et al. |
| 2024/0126552 | A1 | 4/2024 | Kalamatianos et al. |
| 2024/0231645 | A1 | 7/2024 | Zhang et al. |
| 2024/0330186 | A1 | 10/2024 | Boraten et al. |
| 2025/0110878 | A1 | 4/2025 | Boraten et al. |
| 2025/0110886 | A1 | 4/2025 | Boraten et al. |
| 2025/0181392 | A1 | 6/2025 | Choi et al. |
| 2025/0307147 | A1 | 10/2025 | Werner et al. |

OTHER PUBLICATIONS

U.S. Appl. No. 17/136,767 , "Notice of Allowance", U.S. Appl. No. 17/136,767, filed Apr. 30, 2024, 18 pages.

U.S. Appl. No. 17/473,242 , "Non-Final Office Action", U.S. Appl. No. 17/473,242, filed Mar. 7, 2024, 16 pages.

Nai, Lifeng , et al., "GraphPIM: Enabling Instruction-Level PIM Offloading in Graph Computing Frameworks", 2017 IEEE International Symposium on High Performance Computer Architecture (HPCA), Feb. 2017, 12 pages.

Xu, Sheng , et al., "TUPIM: A Transparent and Universal Processing-in-Memory Architecture for Unmodified Binaries", GLSVLSI '20: Proceedings of the 2020 on Great Lakes Symposium on VLSI, Sep. 2020, 6 pages.

Werner, David Andrew, et al., "Pursuant to MPEP § 2001.06(b) the applicant brings the following co-pending application to the Examiner's attention:", U.S. Appl. No. 18/621,319, filed Mar. 29, 2024, 61 pages.

U.S. Appl. No. 18/298,723 , "Non-Final Office Action", U.S. Appl. No. 18/298,723, filed Jun. 20, 2024, 9 pages.

"ARM946E-S Technical Reference Manual r1p1", Arm Developer [retrieved May 17, 2023]. Retrieved from the Internet <https://developer.arm.com/documentation/ddi0201/d/programmer-s-model/cp15-register-map-summary/register-7--cache-operations-register>., 6 Pages.

"Google Project Zero", GitHub Inc., Uplaoded by Projects by Google Project Zero [retrieved Sep. 15, 2022]. Retrieved from the Internet <https://github.com/googleprojectzero>., 3 Pages.

"HPCA 2021", The 27th IEEE International Symposium on High-Performance Computer Architecture (HPCA-27), Seoul, South Korea [retrieved Sep. 15, 2022]. Retrieved from the Internet <https://hpca-conf.org/2021/keynotes/>., Mar. 2021, 3 Pages.

U.S. Appl. No. 17/123,270, , "Final Office Action", U.S. Appl. No. 17/123,270, filed Nov. 23, 2021, 15 pages.

U.S. Appl. No. 17/123,270, , "Non-Final Office Action", U.S. Appl. No. 17/123,270, filed Aug. 4, 2021, 14 pages.

U.S. Appl. No. 17/123,270, , "Notice of Allowance", U.S. Appl. No. 17/123,270, filed Sep. 7, 2023, 7 pages.

U.S. Appl. No. 17/123,270, , "Notice of Allowance", U.S. Appl. No. 17/123,270, filed Nov. 10, 2022, 7 pages.

U.S. Appl. No. 17/137,140, , "Final Office Action", U.S. Appl. No. 17/137,140, filed Aug. 15, 2022, 8 pages.

U.S. Appl. No. 17/137, 140, , "Non-Final Office Action", U.S. Appl. No. 17/137,140, filed Mar. 9, 2022, 8 pages.

U.S. Appl. No. 17/137,140, , "Notice of Allowance", U.S. Appl. No. 17/137,140, filed Dec. 8, 2022, 8 pages.

U.S. Appl. No. 17/745,278, , "Non-Final Office Action", U.S. Appl. No. 17/745,278, filed Feb. 23, 2023, 8 pages.

U.S. Appl. No. 17/745,278, , "Notice of Allowance", U.S. Appl. No. 17/745,278, filed Jun. 14, 2023, 5 pages.

Adhinarayanan, Vignesh et al., "Pursuant to MPEP § 2001.06(b) the applicant brings the following co-pending application to the Examiner's attention:", U.S. Appl. No. 17/855,157, filed Jun. 30, 2022, 37 pages.

Agrawal, Varun et al., "Pursuant to MPEP § 2001.06(b) the applicant brings the following co-pending application to the Examiner's attention:", U.S. Appl. No. 17/561,112, filed Dec. 23, 2021, 25 pages.

Alsop, Jonathan et al., "Pursuant to MPEP § 2001.06(b) the applicant brings the following co-pending application to the Examiner's attention:", U.S. Appl. No. 17/853,613, filed Jun. 29, 2022, 28 pages.

Aweke, Zelalem B. et al., "ANVIL: Software-Based Protection Against Next-Generation Rowhammer Attacks", ACM SIGPLAN Notices, vol. 51, No. 4 [retrieved Sep. 15, 2022]. Retrieved from the Internet <http://www.seclab.cs.stonybrook.edu/seclab/pubs/ANVIL.pdf>., Mar. 25, 2016, 13 Pages.

(56)        References Cited

OTHER PUBLICATIONS

Boraten, Travis H. et al., "Pursuant to MPEP § 2001.06(b) the applicant brings the following co-pending application to the Examiner's attention:", U.S. Appl. No. 18/192,925, filed Mar. 30, 2023, 48 pages.

Boraten, Travis H. et al., "Pursuant to MPEP § 2001.06(b) the applicant brings the following co-pending application to the Examiner's attention:", U.S. Appl. No. 18/374,951, filed Sep. 29, 2023, 50 pages.

Boraten, Travis H. et al., "Pursuant to MPEP § 2001.06(b) the applicant brings the following co-pending application to the Examiner's attention:", U.S. Appl. No. 18/374,969, filed Sep. 29, 2023, 51 pages.

Boraten, Travis H. , "Pursuant to MPEP § 2001.06(b) the applicant brings the following co-pending application to the Examiner's attention:", U.S. Appl. No. 18/146,904, filed Dec. 27, 2022, 53 pages.

Boyer, Michael W. et al., "Pursuant to MPEP § 2001.06(b) the applicant brings the following co-pending application to the Examiner's attention:", U.S. Appl. No. 17/719,225, filed Apr. 12, 2022, 32 pages.

Brasser, Ferdinand et al., "CAn't touch this: software-only mitigation against rowhammer attacks targeting kernel memory", Proceedings of the 26th USENIX Conference on Security Symposium [retrieved Sep. 15, 2022]. Retrieved from the Internet <https://www.usenix.org/system/files/conference/usenixsecurity17/sec17-brasser.pdf>., Aug. 16, 2017, 15 Pages.

Cantin, J.F. et al., "Coarse-Grain Coherence Tracking: RegionScout and Region Coherence Arrays", IEEE Micro, vol. 26, No. 1 [retrieved Oct. 16, 2022]. Retrieved from the Internet <https://pharm.ece.wisc.edu/papers/ieeemicro2005.pdf>., Oct. 11, 2022, 10 Pages.

Gulur, Nagendra Dwarakanath et al., "Multiple sub-row buffers in DRAM: unlocking performance and energy improvement opportunities", Proceedings of the 26th ACM international conference on Supercomputing [retrieved Sep. 15, 2022]. Retrieved from the Internet <https://csrl.cse.unt.edu/sites/default/files/publications/p257-gulur.pdf>., Jun. 25, 2012, 10 Pages.

Hassan, Hasan et al., "Uncovering In-DRAM RowHammer Protection Mechanisms: A New Methodology, Custom RowHammer Patterns, and Implications", 54th Annual IEEE/ACM International Symposium on Microarchitecture [retrieved Sep. 15, 2022]. Retrieved from the Internet <https://arxiv.org/pdf/2110.10603.pdf>., Oct. 17, 2021, 16 Pages.

Jin, Xingyu et al., "Project Zero", News and updates from the Project Zero team at Google [retrieved Sep. 15, 2022]. Retrieved from the Internet <https://googleprojectzero.blogspot.com/>., Aug. 10, 2022, 15 Pages.

Kim, Jeremie S. et al., "Revisiting RowHammer: An Experimental Analysis of Modern DRAM Devices and Mitigation Techniques", Cornell University arXiv, arXiv.org [retrieved Sep. 15, 2022]. Retrieved from the Internet <https://arxiv.org/pdf/2005.13121.pdf>., May 29, 2020, 15 Pages.

Kim, Nam Sung , "A Journey to a Commercial-Grade Function-In-Memory (FIM) Chip Development", HPCA-2021, Keynote [retrieved May 10, 2023]. Retrieved from the Internet <https://hpca-conf.org/2021/keynotes/>., Mar. 3, 2021, 3 Pages.

Kim, Nam Sung , "A Journey to a Commercial-Grade Processing-In-Memory (PIM) Chip Development", The 27th IEEE International Symposium on High-Performance Computer Architecture (HPCA-27), Seoul, South Korea [retrieved May 24, 2023]. Retrieved from the Internet <https://hpca-conf.org/2021/keynotes/>., Mar. 3, 2021, 3 Pages.

Kim, Yoongu et al., "A case for exploiting subarray-level parallelism (SALP) in DRAM", 2012 39th Annual International Symposium on Computer Architecture (ISCA) [retrieved Sep. 15, 2022]. Retrieved from the Internet <https://www.pdl.cmu.edu/PDL-FTP/NVM/ISCA39_SALP.pdf>., Sep. 2012, 12 Pages.

Kim, Yoongu et al., "Flipping bits in memory without accessing them: an experimental study of DRAM disturbance errors", ACM SIGARCH Computer Architecture News, vol. 42, No. 3 [retrieved Sep. 15, 2022]. Retrieved from the Internet <https://people.cs.pitt.edu/~znati/Courses/cs2001/2001pprs/row-hammering.pdf>., Jun. 14, 2014, 12 Pages.

Konoth, Radhesh Krishnan , "ZebRAM: Comprehensive and Compatible Software Protection Against Rowhammer Attacks", 13th USENIX Symposium on Operating Systems Design and Implementation [retrieved Sep. 15, 2022]. Retrieved from the Internet <https://www.usenix.net/system/files/osdi18-konoth.pdf>., Oct. 2018, 15 Pages.

Kotra, Jagadish B. et al., "Pursuant to MPEP § 2001.06(b) the applicant brings the following co-pending application to the Examiner's attention:", U.S. Appl. No. 18/146,509, filed Dec. 27, 2022, 48 pages.

Lamport, Leslie , "Sharing Memory Between Processes", Part II. Interprocess Communication [retrieved May 24, 2023]. Retrieved from the Internet <https://techpubs.jurassic.nl/manuals/0630/developer/T_IRIX_Prog/sgi_html/ch03.html#id5198232>., Jun. 1986, 19 Pages.

Lee, Chulki et al., "DRAM Row hammer micro-benchmark", GitHub, Inc. Uploaded by rowhammer-test [retrieved Sep. 15, 2022]. Retrieved from the Internet <https://github.com/google/rowhammer-test>., 3 Pages.

Lee, Eojin et al., "TWiCe: preventing row-hammering by exploiting time window counters", Proceedings of the 46th International Symposium on Computer Architecture [retrieved Sep. 15, 2022]. Retrieved from the Internet <https://cpb-us-w2.wpmucdn.com/sites.coecis.cornell.edu/dist/7/89/files/2019/06/isca19-334.pdf>., Jun. 22, 2019, 12 Pages.

Orosa, Lois et al., "A Deeper Look into RowHammer's Sensitivities: Experimental Analysis of Real DRAM Chips and Implications on Future Attacks and Defenses", Cornell University arXiv, arXiv.org [retrieved Sep. 15, 2022]. Retrieved from the Internet <https://arxiv.org/pdf/2110.10291.pdf>., Oct. 19, 2021, 17 Pages.

Qureshi, Moinuddin et al., "Hydra: enabling low-overhead mitigation of row-hammer at ultra-low thresholds via hybrid tracking", Proceedings of the 49th Annual International Symposium on Computer Architecture [retrieved Sep. 15, 2022]. Retrieved from the Internet <https://memlab.ece.gatech.edu/papers/ISCA_2022_1.pdf>., Jun. 11, 2022, 12 Pages.

Saileshwar, Gururaj , "Randomized row-swap: mitigating Row Hammer by breaking spatial correlation between aggressor and victim rows", Proceedings of the 27th ACM International Conference on Architectural Support for Programming Languages and Operating Systems [retrieved Sep. 15, 2022]. Retrieved from the Internet <https://gururaj-s.github.io/assets/pdf/ASPLOS22_Saileshwar.pdf>., Feb. 28, 2022, 14 Pages.

Yağlikçl, Giray A. et al., "BlockHammer: Preventing RowHammer at Low Cost by Blacklisting Rapidly-Accessed DRAM Rows", Cornell University arXiv, arXiv.org [retrieved Sep. 15, 2022]. Retrieved from the Internet <https://arxiv.org/pdf/2102.05981.pdf>., Feb. 11, 2021, 15 Pages.

U.S. Appl. No. 17/136,767 , "Non-Final Office Action", U.S. Appl. No. 17/136,767, filed Dec. 20, 2023, 20 pages.

Ahn, Junwhan , et al., "PIM-enabled instructions: a low-overhead, locality-aware processing-in-memory architecture", ACM SIGARCH Computer Architecture News, vol. 43, No. 3S [retrieved Jan. 12, 2024]. Retrieved from the Internet <https://doi.org/10.1145/2872887.2750385>, Jun. 13, 2015, 13 pages.

Byoung-Hak, Kim , et al., "Exploration of a PIM Design Configuration for Energy-Efficient Task Offloading", 2019 IEEE International Symposium on Circuits and Systems (ISCAS) [retrieved Jan. 12, 2024]. Retrieved from the Internet <https://doi.org/10.1109/ISCAS.2019.8702339>, May 2019, 4 pages.

Ghose, S , et al., "Processing-in-memory: A workload-driven perspective", IBM Journal of Research and Development, vol. 63, No. 6 [retrieved Jan. 12, 2024]. Retrieved from the Internet <https://doi.org/10.1147/JRD.2019.2934048> 1 of 2, Aug. 8, 2019, 19 pages.

Ghose, S, et al., "Processing-in-memory: A workload-driven perspective", IBM Journal of Research and Development, vol. 63, No. 6 [retrieved Jan. 12, 2024-]. Retrieved from the Internet <https://doi.org/10.1147/JRD.2019.2934048> 2 of 2, Aug. 8, 2019, 19 pages.

Lee, Won Jun , et al., "Design of Processing—"Inside"—Memory Optimized for DRAM Behaviors", IEEE Access, vol. 7 [retrieved

(56) References Cited

OTHER PUBLICATIONS

Jan. 12, 2024]. Retrieved from the Internet <https://doi.org/10.1109/ACCESS.2019.2924240>, Jun. 21, 2019, 16 pages.

Pattnaik, Ashutosh , et al., "Scheduling techniques for GPU architectures with processing-in-memory capabilities", PACT '16: Proceedings of the 2016 International Conference on Parallel Architectures and Compilation [retrieved Oct. 16, 2022]. Retrieved from the Internet <https://research.ece.cmu.edu/safari/pubs/scheduling-for-GPU-processing-in-memory_pact16.pdf>., Sep. 11, 2016, 14 Pages.

"Final Office Action", U.S. Appl. No. 17/473,242, filed Oct. 22, 2024, 13 pages.

"Final Office Action", U.S. Appl. No. 18/298,723, filed Oct. 11, 2024, 7 pages.

"Non-Final Office Action", U.S. Appl. No. 18/374,951, filed Nov. 7, 2024, 10 pages.

"Corrected Notice of Allowability", U.S. Appl. No. 18/374,969, filed Jan. 15, 2025, 2 pages.

"Notice of Allowance", U.S. Appl. No. 18/374,969, filed Jan. 2, 2025, 10 pages.

U.S. Appl. No. 18/393,657 , "Notice of Allowance", U.S. Appl. No. 18/393,657, filed Jul. 31, 2024, 9 pages.

"Notice of Allowance", U.S. Appl. No. 17/853,613, filed Apr. 1, 2025, 6 pages.

"Non-Final Office Action", U.S. Appl. No. 18/298,723, filed Mar. 19, 2025, 9 pages.

"Final Office Action", U.S. Appl. No. 18/374,951, filed May 8, 2025, 11 pages.

"Non-Final Office Action", U.S. Appl. No. 17/473,242, filed Jun. 24, 2025, 15 pages.

"Non-Final Office Action", U.S. Appl. No. 18/192,925, filed Aug. 26, 2025, 23 pages.

"Non-Final Office Action", U.S. Appl. No. 18/374,951, filed Aug. 27, 2025, 11 pages.

"Corrected Notice of Allowability", U.S. Appl. No. 18/621,319, filed Aug. 4, 2025, 2 pages.

"Notice of Allowance", U.S. Appl. No. 18/621,319, filed Jun. 18, 2025, 13 pages.

"Notice Of Allowance", U.S. Appl. No. 18/298,723, filed Aug. 13, 2025; 8 pages.

Final Office Action issued in U.S. Appl. No. 18/192,925, mailed Jan. 27, 2026, 25 pages.

* cited by examiner

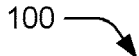
100
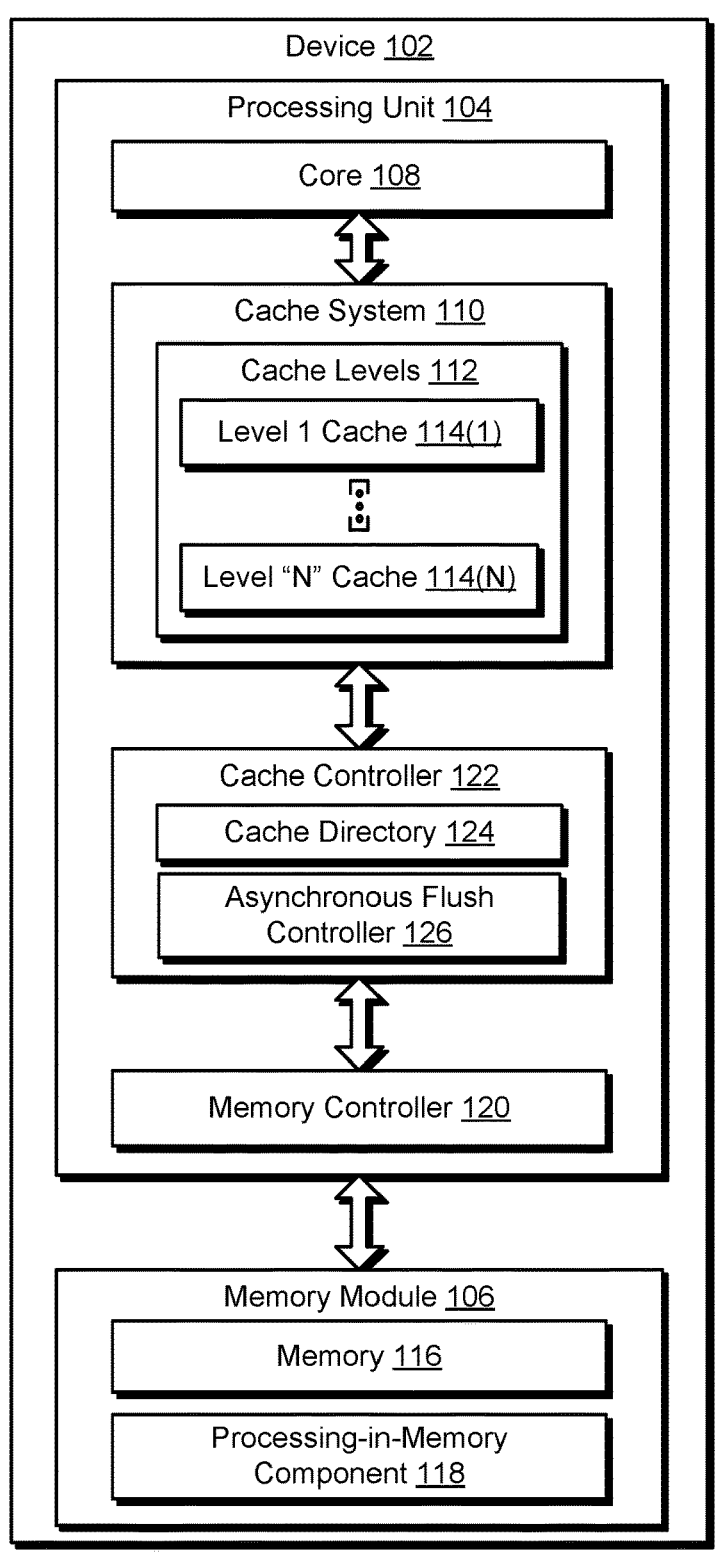
FIG. 1

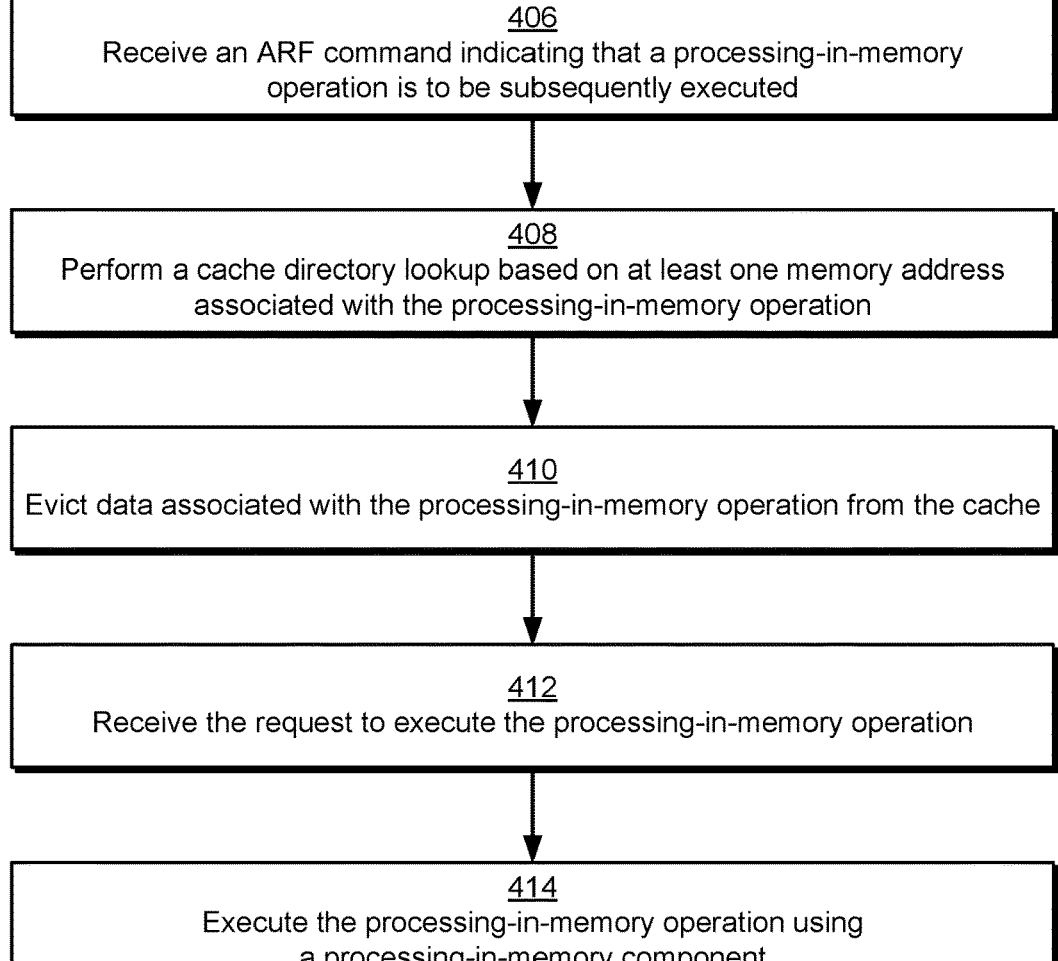

400

402
Receive a memory request identifying a memory address

404
Store data associated with the memory request in a cache

406
Receive an ARF command indicating that a processing-in-memory operation is to be subsequently executed

408
Perform a cache directory lookup based on at least one memory address associated with the processing-in-memory operation

410
Evict data associated with the processing-in-memory operation from the cache

412
Receive the request to execute the processing-in-memory operation

414
Execute the processing-in-memory operation using a processing-in-memory component

FIG. 4

PREEMPTIVE FLUSHING OF PROCESSING-IN-MEMORY DATA STRUCTURES

BACKGROUND

Processing-in-memory (PIM) architectures move processing of memory-intensive computations to memory. This contrasts with standard computer architectures which communicate data back and forth between a memory and a remote processing unit. In terms of data communication pathways, remote processing units of conventional computer architectures are further away from memory than processing-in-memory components.

As a result, these conventional computer architectures suffer from increased data transfer latency, which can decrease overall computer performance and increase energy cost. Further, due to the proximity to memory, PIM architectures can also provision higher memory bandwidth and reduced memory access energy relative to conventional computer architectures particularly when the volume of data transferred between the memory and the remote processing unit is large. Thus, processing-in-memory architectures enable increased energy efficiency (e.g., performance per Joule) while reducing data transfer latency as compared to conventional computer architectures that implement remote processing hardware.

BRIEF DESCRIPTION OF THE DRAWINGS

FIG. 1 is a block diagram of a non-limiting example system having a device that implements a processing unit and memory module to implement the preemptive flushing of processing-in-memory data structures techniques described herein.

FIG. 4 is a block diagram of a non-limiting example procedure describing performance of preemptively flushing data from a cache system, for subsequent use by a processing-in-memory component, using an asynchronous range flush command.

DETAILED DESCRIPTION

Figure 2:
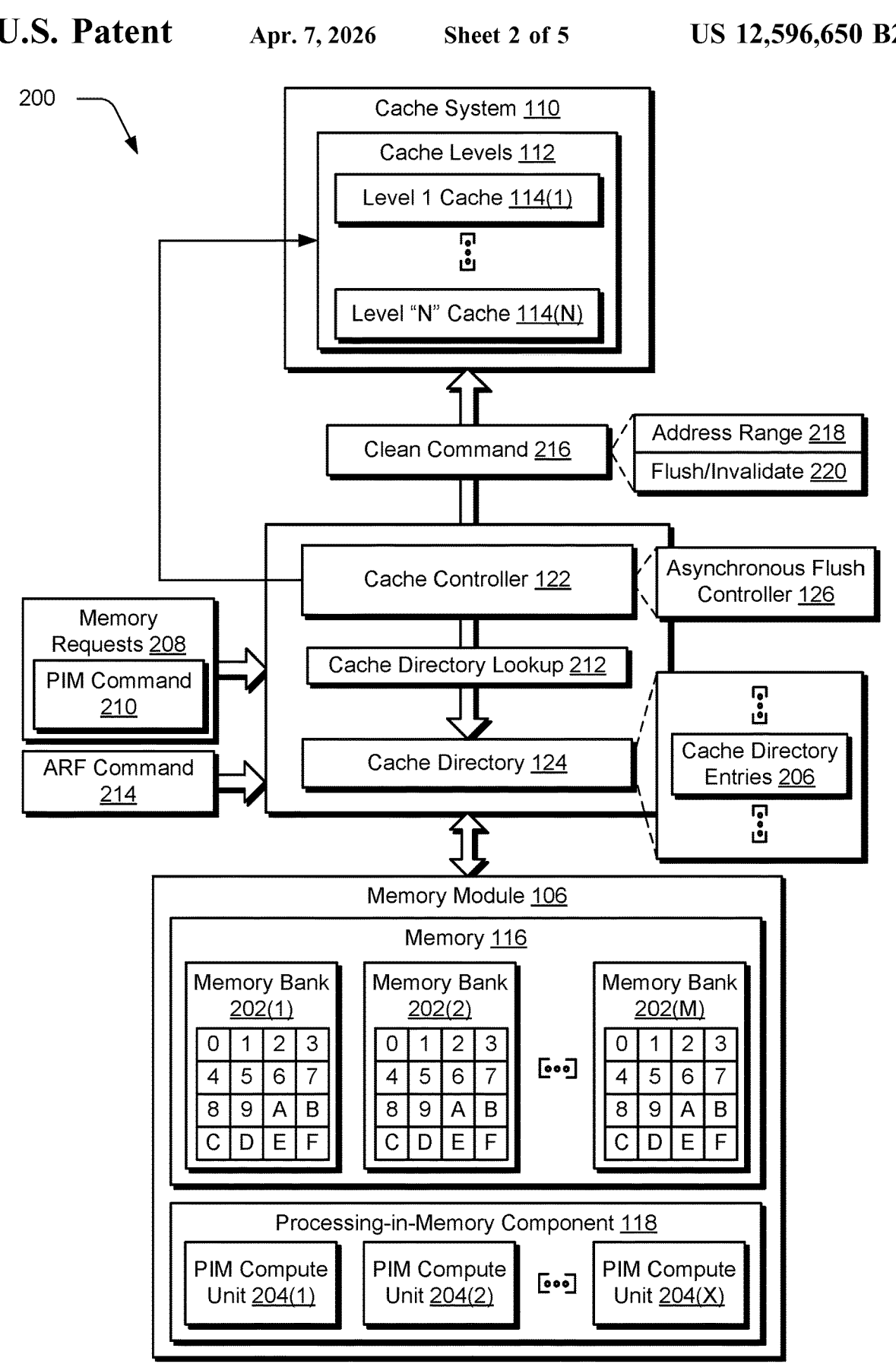
FIG. 2 is a block diagram of a non-limiting example system showing operation of a cache controller of FIG. 1 in greater detail as preemptively flushing data from a cache system, for subsequent use by a processing-in-memory component, using an asynchronous range flush command.

Processing-in-memory (PIM) incorporates processing capability within memory modules so that tasks are processed directly within the memory modules. Processing-in-memory (PIM) techniques also refer to incorporation of processing capability near memory modules so that tasks are also processed without costly round-trip transmission to host processors or other distant computing units. To do so, processing-in-memory leverages techniques that are configurable to trigger local computations at multiple memory modules in parallel without involving data movement across a memory module interface, which improves performance, especially for data-intensive workloads such as machine learning.

One of the technical problems of offloading computations to memory (e.g., using PIM techniques) is to ensure that data that is a subject of a memory request is valid in memory (e.g., for use as part of executing a processing-in-memory operation). A device, for instance, is configurable to include a plurality of cores and associated cache systems as well as memory included in the memory modules (e.g., as dynamic random-access memory (DRAM)).

In order to ensure data validity such that a processing-in-memory operation is performed using "valid" data, a cache controller implements cache directory lookups to query a cache directory. The cache directory maintains cache directory entries that reference memory addresses maintained in respective cache levels of the cache system (e.g., a location of a respective memory address and a status of the respective memory address). The cache directory entries also reference whether data at those memory addresses is "clean" or "dirty" as being unchanged or changed with respect to versions of that data maintained in memory. In other words, the cache directory lookup indicates whether data maintained in the memory has a corresponding version in the cache system and whether that version is changed in the cache system with respect to the memory.

If the data in the memory is not valid in memory for execution of a processing-in-memory instruction (meaning that the data in the cache system is more recent) the cache controller transmits a "clean and invalidate" command to the cache system. The invalidation command specifies at least a portion of data maintained in the cache system to be evicted, and thus causes the cache system to invalidate the data identified by the invalidation command and perform a writeback to memory (e.g., transmit a cache response to the memory that includes the data, such that the data in the memory is subsequently valid for computation by the processing-in-memory component). Stated differently, a "clean and invalidate" command causes the cache system to write data back to memory (e.g., "flush" the data) and/or invalidate the data in the cache system. Once data involved in executing a processing-in-memory request is flushed back to memory, the processing-in-memory request can be executed (e.g., the processing-in-memory request is released by a memory controller to a processing-in-memory component for execution as part of performing one or more processing-in-memory operations).

For example, if a cache system stores "dirty" data for a memory address associated with a processing-in-memory request, the dirty data is first flushed from the cache system to memory to ensure that one or more processing-in-memory operations included in the processing-in-memory request are performed using a most recent version of the data. If the cache system stores clean data for the processing-in-memory memory request, the clean data is invalidated at the cache system to ensure that data involved in executing the processing-in-memory request is not stale inside the cache system. This process of invalidating data maintained in cache by flushing the data to system memory before it can be processed as part of executing one or more processing-in-memory operations causes conventional systems to stall (e.g., while waiting for the cached data to be evicted and written back before a processing-in-memory operation involving the data can be executed). This system stall experienced by conventional systems results in computational inefficiencies, increased power consumption, and delays.

To overcome these conventional shortcomings, techniques for preemptive flushing of processing-in-memory data structures are described. The techniques are configured to reduce stall time associated with conventional execution of processing-in-memory operations by flushing cached data involved in the processing-in-memory operations before the processing-in-memory operations are scheduled (e.g., prior to receiving a processing-in-memory command or beginning computation with processing-in-memory). To enable the described techniques, a cache controller implements an asynchronous flush controller. The asynchronous flush controller receives an indication that an upcoming processing-in-memory command to be executed as part of performing a computational task, involves processing data associated with an address range. In implementations, such an indication is received in the form of an asynchronous range flush (ARF) command issued by a host for which a processing-in-memory component executes processing-in-memory commands. While the system is executing other operations as part of performing the computational task, the asynchronous flush controller iterates over the address range for the data involved in executing the processing-in-memory command to determine whether the data is currently stored in a cache system so that it can be flushed prior to when the subsequent processing-in-memory command is to be executed.

In response to determining that the data involved in executing the processing-in-memory command is likely to be stored in a cache when the subsequent processing-in-memory command is to be executed, the asynchronous flush controller sends clean command to the cache system. The clean command includes information specifying the address range for the data involved in executing the processing-in-memory command and instructs the cache system to invalidate and, if required, flush the data to memory for access by a processing-in-memory component when executing the processing-in-memory command. The clean command thus forces "cleaning" of the data involved in executing the processing-in-memory command, such that the data is current in memory accessible by the processing-in-memory component upon execution of a processing-in-memory command. In implementations, the asynchronous flush controller is informed that the data involved in executing the processing-in-memory command is likely to be stored in a cache when the subsequent processing-in-memory command is to be executed based on explicit (e.g., programmer-specified) hints in code executed as part of performing the computational task, based on compiler analysis of the code executed as part of performing the computational task, or combinations thereof.

For instance, in implementations where a programmer identifies that data involved in executing a processing-in-memory command is likely to be stored in a cache when the processing-in-memory command is scheduled for execution, the programmer can include a function in code for the computational task that causes the asynchronous flush controller to preemptively flush the cached data before the processing-in-memory command is initiated. For instance, the programmer can include instructions in the code to issue an ARF command to the asynchronous flush controller before the processing-in-memory command is initiated. Alternatively or additionally, the system implementing the asynchronous flush controller includes a compiler that analyzes behavior of host-side (e.g., a processor core) access and/or modification of data, which is subsequently involved in executing a processing-in-memory command, by prior commands or operations for the computational task. Based on compiler analysis, an ARF command is inserted into code between a host-side modification of data involved in executing the processing-in-memory command and initiation of the processing-in-memory command, such that the asynchronous flush controller receives the ARF command before a processing-in-memory command is scheduled for execution.

The asynchronous flush controller optimizes the performance improvement provided by ARF commands placed at appropriate locations in program binary (e.g., code) for the computational task being performed by issuing clean commands to invalidate, and optionally flush, data from one or more address ranges specified in the ARF commands. For instance, the asynchronous flush controller schedules a clean command at a sufficient time prior to initiation of a processing-in-memory command, such that the cache system has adequate time to invalidate or flush the corresponding data before initiation of the processing-in-memory command. Similarly, the asynchronous flush controller avoids scheduling a clean command at a point where subsequent non-processing-in-memory commands that occur prior to the processing-in-memory command will return the flushed data to the cache system (e.g., due to host-side modifications, predictive prefetching, and so forth).

In some implementations, the asynchronous flush controller further optimizes performance improvements provided by ARF commands by selectively skipping portions of data involved in executing a processing-in-memory command that are unlikely to be maintained in a cache system upon initiation of the processing-in-memory command. For instance, in implementations where a processing-in-memory command involves an array of data, because arrays are often accessed in a sequential manner, the beginning of the array is less likely to be maintained in a cache system (e.g., a non-processing-in-memory operation involving the array likely includes evicting a beginning of the array from cache to make room for the end of the array). In such implementations, the asynchronous flush controller skips checking for the beginning of the array in cache (e.g., does not perform cache directory lookups for the beginning of the array) and instead specifies a starting address for the clean command that is a fraction of the way through the array. In implementations, the precise location at which the clean command begins for such an array depends on a system cache size and a data structure size of the array.

Alternatively or additionally, the asynchronous flush controller is configured to skip checking for data associated with a portion of an address range based on cache directory lookups indicating that a number of successive data elements in the address range are not located in the cache system. For instance, rather than performing lookups for every single data element included in an address range for data involved in a processing-in-memory operation, that asynchronous flush controller skips ahead in the address range after a number of data element cache misses to search for data elements in the address range that are likely to be stored in cache. By intelligently skipping ahead, the asynchronous flush controller avoids delay associated with looking up every single data element in an address range and enables earlier flushing of data elements involved in executing a subsequent processing-in-memory operation.

Alternatively or additionally, in implementations where a processing-in-memory command involves a large address range of data elements, a manner in which ARF commands are inserted (e.g., by a compiler into program code for a computational task that involves executing the processing-in-memory command), includes subdividing the large address range into smaller address ranges of data elements and generating separate ARF commands for each of the smaller address ranges. In turn, the separate ARF commands cause the asynchronous flush controller to generate and issue separate clean commands for each of the smaller address ranges. By segmenting a large address range into smaller address ranges, the asynchronous flush controller avoids scenarios where the processing-in-memory command is stalled while waiting for the large address range of data elements to be flushed form the cache system.

Advantageously, the asynchronous range flush techniques described herein enable preemptive writing back of data involved in a processing-in-memory command from a cache system to main memory, before the processing-in-memory command is issued as part of performing a computational task. By preemptively flushing data, the described techniques avoid the increased latency and stall time faced by conventional systems when executing the same processing-in-memory command(s) of the computational task. As a further benefit, the asynchronous flush controller is configured to perform cache directory lookups and issue clean commands while processing-in-memory and/or non-processing-in-memory commands of the computational task are being executed, thus allowing for unimpeded progress of the computational task, which Is not possible using conventional systems.

In some aspects, the techniques described herein relate to a system including: a cache system including a plurality of cache levels, and a cache controller configured to: identify that a processing-in-memory command involves at least one data element stored in the cache system, and evict the at least one data element from the cache system prior to issuance of the processing-in-memory command.

In some aspects, the techniques described herein relate to a system, wherein the processing-in-memory command is associated with a computational task, and wherein the cache controller is configured to identify that the processing-in-memory command involves at least one data element stored in the cache system based on code for the computational task including a non-processing-in-memory command that modifies the at least one data element prior to issuance of the processing-in-memory command.

In some aspects, the techniques described herein relate to a system, wherein the cache controller is configured to evict the at least one data element from the cache system by transmitting a clean command to the cache system that specifies an address range including the at least one data element and an instruction to flush the at least one data element to memory of the system or invalidate the at least one data element in the cache system.

In some aspects, the techniques described herein relate to a system, wherein the processing-in-memory command is associated with a computational task, and wherein the cache controller generates the clean command by performing a cache directory lookup for at least a portion of data elements included in the address range during execution of one or more different commands involved in performing the computational task.

In some aspects, the techniques described herein relate to a system, wherein the cache controller generates the address range of the clean command based on one or more cache hit responses to the cache directory lookup.

In some aspects, the techniques described herein relate to a system, wherein the cache controller performs the cache directory lookup by skipping a beginning portion of the data elements included in the address range based on the address range satisfying a threshold size.

In some aspects, the techniques described herein relate to a system, wherein the threshold size for the address range is based on a storage size of the cache system.

In some aspects, the techniques described herein relate to a system, wherein the cache controller performs the cache directory lookup by skipping a threshold number of the data elements included in the address range based on the cache directory lookup returning a number of successive cache misses.

In some aspects, the techniques described herein relate to a system, wherein the processing-in-memory command is associated with a computational task, and wherein the cache controller transmits the clean command during execution of one or more different commands involved in performing the computational task.

In some aspects, the techniques described herein relate to a system, further including a core of a processing unit, wherein the processing-in-memory command is issued by the core of the processing unit.

In some aspects, the techniques described herein relate to a device including: a cache controller configured to: receive an indication that a processing-in-memory command to be subsequently executed involves at least one data element, perform a cache directory lookup to determine whether the at least one data element is stored in a cache system, and evict the at least one data element from the cache system prior to issuance of the processing-in-memory command.

In some aspects, the techniques described herein relate to a device, wherein the cache controller evicts the at least one data element from the cache system by transmitting a clean command to the cache system that specifies an address range including the at least one data element and an instruction to flush the at least one data element to memory or invalidate the at least one data element in the cache system.

In some aspects, the techniques described herein relate to a device, wherein the cache controller performs the cache directory lookup by skipping a beginning portion of the at least one data element included in the address range in response to the address range satisfying a threshold size.

In some aspects, the techniques described herein relate to a device, wherein the threshold size for the address range is based on a storage size of the cache system.

In some aspects, the techniques described herein relate to a device, wherein the processing-in-memory command is associated with a computational task, and wherein the cache controller generates the clean command by performing a cache directory lookup for at least a portion of data elements included in the address range during execution of one or more different commands involved in performing the computational task.

In some aspects, the techniques described herein relate to a device, wherein the cache controller generates the address range of the clean command based on one or more cache hit responses to the cache directory lookup.

In some aspects, the techniques described herein relate to a device, wherein the cache controller performs the cache directory lookup by skipping a threshold number of the at least one data element included in the address range based on the cache directory lookup returning a number of successive cache misses.

In some aspects, the techniques described herein relate to a device, wherein the processing-in-memory command is associated with a computational task, and wherein the cache controller transmits the clean command during execution of one or more different commands involved in performing the computational task.

In some aspects, the techniques described herein relate to a device, wherein the processing-in-memory command is associated with a computational task, and wherein the indication that the processing-in-memory command involves at least one data element stored in the cache system is generated based on code for the computational task including a non-processing-in-memory command that modifies the at least one data element prior to issuance of the processing-in-memory command.

In some aspects, the techniques described herein relate to a method including: executing, by a core of a processing unit, a plurality of commands as part of performing a computational task, identifying that the plurality of commands include a processing-in-memory instruction that accesses at least one data element stored in a cache system during performance of the computational task, evicting the at least one data element from the cache system while the core of a processing unit is executing a portion of the plurality of commands that occur prior to the processing-in-memory instruction, and causing, by the core of the processing unit, execution of the processing-in-memory instruction by a processing-in-memory component by transmitting the processing-in-memory instruction to the processing-in-memory component after the at least one data element is evicted from the cache system.

FIG. 1 is a block diagram of a non-limiting example system 100 having a device that implements a processing unit and memory module to implement preemptive flushing of data for use by one or more processing-in-memory components in accordance with the techniques described herein. The device 102 includes a processing unit 104 and a memory module 106 communicatively coupled via a bus structure.

The techniques described herein are usable by a wide range of device 102 configurations. Such device configurations include, by way of example and not limitation, computing devices, servers, mobile devices (e.g., wearables, mobile phones, tablets, laptops), processors (e.g., graphics processing units, central processing units, and accelerators), digital signal processors, machine learning inference accelerators, disk array controllers, hard disk drive host adapters, memory cards, solid-state drives, wireless communications hardware connections, Ethernet hardware connections, switches, bridges, network interface controllers, and other apparatus configurations. Additional examples include artificial intelligence training accelerators, cryptography and compression accelerators, network packet processors, and video coders and decoders.

The processing unit 104 includes at least one core 108. The core 108 is an electronic circuit (e.g., implemented as an integrated circuit) that performs various operations on and/ or using data in the memory module 106. Examples of processing unit 104 and core 108 configurations include, but are not limited to, a central processing unit (CPU), a graphics processing unit (GPU), a field programmable gate array (FPGA), an accelerated processing unit (APU), and a digital signal processor (DSP). For example, the core 108 is a processing unit that reads and executes instructions (e.g., of a program), examples of which include to add, to move data, and to branch. Although one core 108 is depicted in the illustrated example, in variations, the device 102 includes more than one core 108 (e.g., the device 102 is a multi-core processor). The memory module 106 is implemented as a printed circuit board, on which, memory 116 (e.g., physical memory) and a processing-in-memory component 118 are disposed (e.g., physically and communicatively coupled using one or more sockets).

The processing unit 104 includes a cache system 110 having a plurality of cache levels 112, examples of which are illustrated as a level 1 cache 114(1) through a level "N" cache 114(N). The cache system 110 is configured in hardware (e.g., as an integrated circuit) communicatively disposed between the processing unit 104 and the memory 116 of the memory module 106. The cache system 110 is configurable as integral with the core 108 as part of the processing unit 104, as a dedicated hardware device as part of the processing unit 104, and so forth. Configuration of the cache levels 112 as hardware is utilized to take advantage of a variety of locality factors. Spatial locality is used to improve operation in situations in which data is requested that is stored physically close to data that is a subject of a previous request. Temporal locality is used to address scenarios in which data that has already been requested will be requested again.

In cache operations, a "hit" occurs to a cache level when data that is subject of a load operation is available via the cache level, and a "miss" occurs when the desired data is not available via the cache level. When employing multiple cache levels, requests are processed through successive cache levels 112 until the data is located. The cache system 110 is configurable in a variety of ways (e.g., in hardware) to address a variety of processing unit 104 configurations, such as a central processing unit cache, graphics processing unit cache, parallel processing unit cache, digital signal processor cache, and so forth.

In one or more implementations, the memory module 106 is a circuit board (e.g., a printed circuit board), on which memory 116 (e.g., physical memory such as dynamic random-access memory) is mounted and includes a processing-in-memory component 118 (e.g., implemented in hardware using one or more integrated circuits). In some variations, one or more integrated circuits of the memory 116 are mounted on the circuit board of the memory module 106, and the memory module 106 includes one or more processing-in-memory components 118. Examples of the memory module 106 include, but are not limited to, a TransFlash memory module, a single in-line memory module (SIMM), and a dual in-line memory module (DIMM). In one or more implementations, the memory module 106 is a single integrated circuit device that incorporates the memory 116 and the processing-in-memory component 118 on a single chip. In some examples, the memory module 106 is formed using multiple chips that implement the memory 116 and the processing-in-memory component 118 that are vertically ("3D") stacked together, are placed side-by-side on an interposer or substrate or are assembled via a combination of vertical stacking or side-by-side placement.

The memory 116 is a device or system that is used to store data, such as for immediate use in a device (e.g., by the core 108 and/or by the processing-in-memory component 118). In one or more implementations, the memory 116 corresponds to semiconductor memory where data is stored within memory cells on one or more integrated circuits. In at least one example, the memory 116 corresponds to or includes volatile memory, examples of which include random-access memory (RAM), dynamic random-access memory (DRAM), synchronous dynamic random-access memory (SDRAM), and static random-access memory (SRAM). Alternatively or in addition, the memory 116 corresponds to or includes non-volatile memory, examples of which include solid state disks (SSD), flash memory, read-only memory (ROM), programmable read-only memory (PROM), erasable programmable read-only memory (EPROM), and electronically erasable programmable read-only memory (EEPROM).

The processing-in-memory component 118 is implemented in hardware (e.g., as an integrated circuit) configured to perform operations responsive to processing-in-memory instructions, processing-in-memory requests, and/or processing-in-memory operations (e.g., received from the core 108). The processing-in-memory component 118 is representative of a processor with example processing capabilities ranging from relatively simple (e.g., an adding machine) to relatively complex (e.g., a CPU/GPU compute core). In an example, the processing-in-memory component 118 processes instructions using data stored in the memory 116.

Processing-in-memory contrasts with standard computer architectures which obtain data from memory, communicate the data to a remote processing unit (e.g., the core 108), and process the data using the remote processing unit (e.g., using the core 108 rather than the processing-in-memory component 118). In various scenarios, the data produced by the remote processing unit as a result of processing the obtained data is written back to memory, which involves communicating the produced data from the remote processing unit to memory.

In terms of data communication pathways, the remote processing unit (e.g., the core 108) is further away from the memory 116 than the processing-in-memory component 118. As a result, these standard computer architectures suffer from increased data transfer latency, reduced data communication bandwidth, and increased data communication energy, particularly when the volume of data transferred between the memory and the remote processing unit is large, which decreases overall computational performance. Thus, the processing-in-memory component 118 enables increased computational performance while reducing data transfer energy as compared to standard computer architectures that implement remote processing hardware. Further, the processing-in-memory component 118 alleviates memory performance and energy bottlenecks by moving one or more memory-intensive computations closer to the memory 116.

Although the processing-in-memory component 118 is illustrated as being disposed within the memory module 106 (e.g., within a same integrated circuit or on a same printed circuit board), other examples are also contemplated. The processing-in-memory component 118, for instance, is also configurable to incorporate processing capability near memory modules so that tasks are also processed without costly round-trip transmission to host processors or other distant computing units. Access to the memory module 106 for the processing unit 104 is controlled through use of a memory controller 120.

The memory controller 120 is a digital circuit (e.g., implemented in hardware) that manages the flow of data to and from the memory 116 of the memory module 106. By way of example, the memory controller 120 includes logic to read and write to the memory 116. In one or more implementations, the memory controller 120 also includes logic to read and write to registers (e.g., temporary data storage) maintained by the processing-in-memory component 118, and to interface with the processing-in-memory component 118 (e.g., to provide instructions for processing by the processing-in-memory component 118).

The memory controller 120 also interfaces with the core 108. For instance, the memory controller 120 receives instructions from the core 108, via the cache controller 122. The instructions involve accessing the memory 116 and/or the registers of the processing-in-memory component 118 and provide data to the core 108 (e.g., for processing by the core 108). In one or more implementations, the memory controller 120 is communicatively located between the core 108 and the memory module 106, and the memory controller 120 interfaces with the core 108, the memory module 106, and the cache controller 122.

The core 108 is configured to initiate processing-in-memory (PIM) operations by the processing-in-memory component 118 using processing-in-memory instructions. In implementations, the core 108 causes the processing-in-memory component 118 to execute one or more processing-in-memory operations by transmitting a processing-in-memory request to the processing-in-memory component 118 that includes instructions for executing one or more operations. To ensure that the processing-in-memory component 118 operates on a valid version of data in the memory 116, a cache controller 122 is employed. The cache controller 122 is configurable in hardware (e.g., as one or more integrated circuits) to support execution of instructions (e.g., by a microcontroller) using valid data in the memory 116.

Validity of the data in the memory 116 refers to a scenario in which a version of data that is to be subject of a processing-in-memory operation is valid (e.g., is accurate in that the data has not been subsequently processed elsewhere) in the processing-in-memory component 118 and the cache system 110. The cache controller 122 is configured to query a cache directory 124 in what is referred to as a "cache directory lookup." The cache directory 124 describes which memory addresses of the memory 116 are maintained in the cache system 110 and a status of data at those memory addresses. A cache directory lookup, for instance, is used to determine whether the data at the memory address is "clean" and unchanged with respect to the data for that memory address maintained in the memory 116 or "dirty" and is changed. Therefore, a cache directory lookup as performed by the cache controller 122 is usable to determine "what" data is stored in the cache system 110 and a status of that data.

Ensuring that data associated with a memory address is "clean" is performable by the cache controller 122 as a flush in a "dirty" scenario in which the data is caused to be "flushed" from the cache system 110 for storage in the memory 116. By flushing dirty data from the cache system 110 to the memory 116, the data becomes clean upon being flushed to memory 116 and is thus valid for use as part of a processing-in-memory operation by the processing-in-memory component 118. In a "clean" scenario, the cache controller 122 generates a cache request to cause the cache system 110 to invalidate the clean data in the cache system 110 such that subsequent accesses to the memory address are performed using the memory 116 and not the cache system 110. This invalidation, or flushing, of clean data from the cache system 110 ensures that the data is also valid for use as part of a processing-in-memory operation (e.g., in that accesses to the data during execution of the processing-in-memory operation are performed to the memory 116 and not the cache system 110). In this manner, subsequent memory requests (e.g., as part of corresponding PIM operations) retrieve the data from memory 116 (e.g., that has been processed as part of the PIM operation) instead of using stale data from the cache system 110.

To reduce system latency involved in executing processing-in-memory instructions, the cache controller 122 is configured to preemptively flush data involved in executing the processing-in-memory instructions from the cache system 110 to memory 116 (e.g., prior to issuance of a processing-in-memory command to execute the processing-in-memory instructions). Functionality of the cache controller 122 to preemptively flush data from the cache system 110 to the memory 116 (e.g., before issuance of a processing-in-memory command by the core 108), is represented by the asynchronous flush controller 126. The asynchronous flush controller 126 is configured (e.g., in hardware, software, or a combination thereof) to execute an asynchronous range flush (ARF) command that specifies an address range that needs to be flushed from the cache system 110. The address range included in an ARF command sent to the asynchronous flush controller 126 corresponds to an address range of a data structure that will be accessed as part of executing one or more processing-in-memory commands. In implementations, the asynchronous flush controller 126 is configured as hardware of the system 100 using one or more integrated circuits. Alternatively or additionally, the asynchronous flush controller 126 is implemented to execute instructions (e.g., as a microcontroller).

The core 108 is configured to identify one or more address ranges to be preemptively flushed from the cache system 110 as part of performing one or more computational tasks (e.g., based on memory requests issued as part of executing application program binary for one or more computational tasks). As described in further detail below, the core 108 is configured to analyze code (e.g., application program binary) for a computational task and generate ARF command instructions for insertion at corresponding locations in the code. By inserting ARF command instructions at appropriate locations in program binary, the core 108 ensures that data structures accessed by a processing-in-memory component 118 as part of executing a processing-in-memory command are flushed from the cache system 110 prior to issuance of the processing-in-memory command (e.g., by the core 108 to the processing-in-memory component 118). Advantageously, the core 108 generates ARF commands in a manner that flushes data structures subsequently involved in a processing-in-memory operation from the cache system 110, while maintaining data in the cache system 110 that is subsequently used by the core 108 to execute a non-processing-in-memory operation. In this manner, the ARF commands described herein reduce latency encountered by conventional systems when executing processing-in-memory operations, and thus improves operational efficiency of the processing-in-memory component 118 (e.g., by ensuring operation on valid data, reducing power consumption, and reducing bottlenecks caused by conventional techniques that stall as a result of waiting to evict cached data after receiving a processing-in-memory command).

FIG. 2 is a block diagram of a non-limiting example system 200 showing operation of a cache controller of FIG. 1 in greater detail as preemptively flushing data from a cache system, for subsequent use by a processing-in-memory component, using an asynchronous range flush command. In the illustrated example of FIG. 2, the memory 116 is implemented using a plurality of memory banks, examples of which are illustrated as memory bank 202(1), memory bank 202(2), . . . , memory bank 202(M), where M represents any integer. Similarly, the processing-in-memory component 118 is illustrated as including respective processing-in-memory (PIM) compute units, examples of which are illustrated as PIM compute unit 204(1), PIM compute unit 204(2), . . . , PIM compute unit 204(X), where X represents any integer.

The PIM compute units 204(1)-204(X) are configurable with a variety of processing capabilities in hardware (e.g., using one or more integrated circuits) ranging from relatively simple (e.g., an adding machine) to relatively complex (e.g., a CPU/GPU compute core). The processing unit 104 is configured to offload memory bound computations to the one or more in-memory processors of the processing-in-memory component 118. To do so, the core 108 generates PIM instructions and transmits the PIM instructions (e.g., via the memory controller 120) to the memory module 106. The processing-in-memory component 118 receives the PIM instructions and processes the instructions as PIM operations using the PIM compute units 204(1)-204(X) and data stored in the memory 116.

Processing-in-memory using PIM compute units 204(1)-204(X) contrasts with standard computer architectures which obtain data from memory 116, communicate the data to the core 108 of the processing unit 104, and process the data using the core 108 rather than the processing-in-memory component 118. In various scenarios, the data produced by the core 108 as a result of processing the obtained data is written back to the memory 116, which involves communicating the produced data over the pathway from the core 108 to the memory 116. In terms of data communication pathways, the core 108 is further away from the memory 116 than the processing-in-memory component 118. As a result, conventional computer architectures suffer from increased data transfer latency, reduced data communication bandwidth, and increased data communication energy, particularly when the volume of data transferred between the memory 116 and the processing unit 104 is large, which can also decrease overall device 102 performance.

In one or more implementations, the core 108 retrieves data from the memory 116 and stores the data in one or more caches levels 112 of a cache system 110 associated with the core 108. By way of example, the cache levels 112 of the core 108 include a level 1 cache 114(1), . . . , through a level "N" cache 114(N). In implementations in which the core 108 is a multi-core processor, for instance, the cache levels 112 include a level 3 cache is shared by each of the multiple cores 108. Thus, in these implementations, each core 108 of the multi-core processor stores data in a level 1 cache, a level 2 cache, and a shared level 3 cache. In terms of data communication pathways, the cache levels 112 are closer to the core 108 than the memory 116, and as such, data stored in the cache system 110 is accessible in less amount of time by the core 108 than an amount of time taken to access the data stored in the memory 116. In implementations, the one or more cores 108 of the processing unit 104 are configurable to include cache subsystems with differing numbers of caches and different hierarchical structures without departing from the spirit or scope of the described techniques.

In various examples, the core 108 retrieves a cache line in response to receiving an instruction to access a particular memory address. As used herein, a "cache line" is a unit of data transfer between the memory 116 and the cache system 110. In one example, the cache line is four bytes and the core 108 retrieves a contiguous four-byte block of data from the memory 116 that includes the data of the particular memory address. Further, the core 108 stores the four-byte block of data as a cache line in the cache system 110. If the core 108 receives a subsequent instruction to access a memory address that is a part of the cache line, the core 108 accesses the data of the memory address from the cache system 110, rather than the memory 116.

In one or more examples, the cache system 110 and the memory 116 store different versions of a corresponding cache line. For instance, the core 108 modifies a cache line that is stored in a cache level 112 of the cache system 110, and as such, the data corresponding to the cache line that is stored in the memory 116 is stale and therefore not valid for operations. Accordingly, the cache controller 122 is employed to enforce cache coherence among the cache system 110 and the memory 116. As described herein, cache coherence is the uniformity of data that is storable in multiple different memory resources in a system (e.g., the cache system 110 and the memory 116). As part of enforcing cache coherence, the cache controller 122 employs a cache directory 124, which includes cache directory entries 206 for cache lines that are stored in one or more of the cache levels 112 of the cache system 110. In response to cache lines being added to the cache system 110, the cache controller 122 creates cache directory entries 206 in the cache directory 124 that includes a range of memory addresses corresponding to the cache line.

In one example, the cache controller 122 receives memory requests 208 to access data of a memory address from the memory 116. As described herein, the memory requests 208 are representative of a plurality of requests for data involved in executing operations of a computational task (e.g., representative of requests for data to be accessed during execution of an application program's binary). In some implementations, the memory requests 208 are representative of at least one PIM command 210, and thus represent a request for a processing-in-memory component 118 to access data of a memory address from the memory 116. Alternatively or additionally, the memory requests 208 are representative of at least one non-PIM command, which refers to a request for the core 108 to access data of a memory address from the memory 116. Based on the memory requests 208, the cache controller 122 performs a cache directory lookup 212 in the cache directory 124. The cache directory lookup 212 is used to determine whether one of the cache directory entries 206 represents a cache line that includes the memory address referenced by the memory request 208 (e.g., to determine what location in the system 200 stores the most current version of data involved in the memory requests 208).

In addition to performing a cache directory lookup 212 for a memory request 208 upon receipt of the memory request 208, the asynchronous flush controller 126 is configured to perform a cache directory lookup 212 for a PIM command 210, prior to receipt of the PIM command 210 as part of the memory requests 208. This functionality is performed in response to receiving an asynchronous range flush (ARF) command 214 (e.g., from the core 108), which is transmitted to the asynchronous flush controller 126 in anticipation of the PIM command 210.

For instance, based on explicit information in program code indicating subsequent arrival of the PIM command 210, based on one or more patterns detected in the memory requests 208, or a combination thereof, the core 108 transmits ARF command 214 to the cache controller 122. The ARF command 214 specifies an address range for which a cache directory lookup 212 is to be performed to determine whether data involved in executing the PIM command 210 is currently maintained in the cache system 110, or likely to be maintained in the cache system 110 upon arrival of the PIM command 210.

By way of example, a cache directory 124 miss for a PIM command 210 occurs when the cache directory entries do not include the memory address (e.g., address range) specified by the PIM command 210, and therefore the data as maintained for that memory address is valid in memory 116. In contrast, a cache directory 124 hit for a PIM command 210 occurs when there is a cache directory entry 206 included in the cache directory 124 having an address range that includes the memory address of the PIM command 210, and therefore the data as maintained for that memory address is not valid in memory 116 (e.g., the data must first be evicted from the cache system 110 and written to memory 116 before it can be accessed as part of executing the PIM command 210).

Thus, the determination of whether a hit "has" or "has not" occurred serves as a basis to determine whether data in the memory specified by the PIM command 210 is valid (e.g., for execution by a respective processing-in-memory component 118). As described above, scenarios in which the data is not valid involve additional latency, either to cause the data to be flushed from the cache system 110 to the memory 116 or set to invalidate the data in the cache system 110. This challenge is increased when confronted with parallel execution scenarios.

As illustrated in FIG. 2, the memory 116 includes a plurality of memory banks 202(1)-202(M) that are organized into one or more memory arrays (e.g., grids), which include rows and columns such that data is stored in individual cells of the memory arrays. The memory banks 202(1)-202(M) are representative of a grouping of banks in relation to which the processing-in-memory component 118 is configured to perform various in-memory processing operations. By way of example, PIM compute units 204(1)-204(X) of the processing-in-memory component 118 are included as part of a memory channel along with respective ones of the memory banks 202(1)-202(M). The processing-in-memory component 118, through use of the PIM compute units 204(1)-204 (X), performs in-memory processing operations on the data that is stored in the memory banks 202(1)-202(M). In the illustrated example, a plurality of memory channels includes a respective one of the PIM compute units 204(1)-204(X) and a respective one of the memory banks 202(1)-202(M), and a cache controller 122 to enforce coherence among the memory banks 202(1)-202(M) within the memory channel and the cache levels 112 of the cache system 110.

The processing-in-memory component 118 is configurable to operate on each of the memory banks 202(1)-202(M) in parallel to execute a single PIM instruction (e.g., an instruction executed as part of carrying out the PIM command 210). In the illustrated example of FIG. 2, the processing-in-memory component 118 is configured to operate on M memory banks 202(1)-202(M) and receives a PIM instruction to read data from a particular row and column address. To execute the instruction, the processing-in-memory component 118 reads the data of the particular row and column address from each of the memory banks 202 (1)-202(M) in parallel.

Therefore, a single PIM instruction of a conventionally configured system triggers a plurality of cache directory lookups 212 in the cache directory 124 (e.g., one lookup for memory addresses in each one of the multiple memory banks 202(1)-202(M)). These lookups are performed to ensure that the requested data stored in each of the memory banks 202(1)-202(M) is "valid" as being coherent with other instances of the requested data stored in the cache system 110.

Continuing with the previous example in which the processing-in-memory component 118 is configured to operate on M memory banks 202(1)-202(M), a standard cache controller 122 performs M cache directory lookups 212 for a single PIM command 210. A cache directory lookup 212, however, is a computationally expensive task, particularly when a significant number (e.g., sixteen) of cache directory lookups are performed sequentially. Moreover, this significant number of cache directory lookups when performed even for a single PIM instruction often create a bottleneck in the cache directory 124 that affects both PIM workloads and non-PIM workloads. These problems are exacerbated by the notion that PIM instructions are often issued together as a series of sequential PIM instructions, rather than interspersed with non-PIM instructions. Due to this, the number of cache directory lookups to be performed multiplies with each sequential PIM instruction, thereby worsening the bottleneck and increasing cache directory lookup 212 latency and latency of operations that depend on these lookups (e.g., delays execution of the PIM command 210 by the processing-in-memory component 118).

To overcome these drawbacks facing conventional systems and techniques, the cache controller 122 implements an asynchronous flush controller 126 to perform a cache directory lookup 212 in response to receiving an ARF command 214. In implementations where the cache directory lookup 212 indicates that that data involved in executing the PIM command 210 is stored in the cache system 110, the asynchronous flush controller 126 generates and transmit a clean command 216 to the cache system 110 before the PIM command 210 is received as part of the memory requests 208. As noted above, the ARF command 214 specifies an address range 218 for data involved in executing the PIM command 210. In implementations where the cache directory lookup 212 indicates that data corresponding to the address range 218 is maintained in the cache system 110, the asynchronous flush controller 126 generates the clean command 216 to include an instruction 220 for the cache system 110 to either invalidate or flush the data corresponding to the address range 218 back to memory 116. In this manner, the address range 218 identifies data for a PIM command 210 that needs to be flushed from the cache system 110, or otherwise retrievable from memory 116, before the processing-in-memory component 118 is able to carry out the PIM command 210.

To optimize system efficiency, the asynchronous flush controller 126 is configured to transmit the clean command 216 to the cache system 110 in a manner that provides sufficient time for the cache system 110 to write the data back to memory 116 before the PIM command 210 is received (e.g., at the memory controller 120). In a similar manner, the asynchronous flush controller 126 is configured to generate and transmit the clean command 216 at a time that ensures the data identified by the address range 218 is not involved in executing a non-processing-in-memory request that precedes the PIM command 210 in the memory requests 208. Accordingly, the asynchronous flush controller 126 avoids transmitting a clean command 216 in a scenario where executing the memory requests 208 (e.g., non-processing-in-memory operations included in the memory requests 208) results in repopulating the cache system 110 with data previously flushed by the clean command 216 that is subsequently involved in executing the PIM command 210.

In implementations, the ARF command 214 identifies, for the PIM command 210, an address range for data involved in executing the PIM command 210. While memory requests 208 for the computational task are being executed prior to initiation of the PIM command 210, the asynchronous flush controller 126 iterates over the address range (e.g., via cache directory lookups 212) for the data involved in executing the PIM command 210 to determine whether the data associated with the address range is currently stored in the cache system 110 prior to when the PIM command 210 is initiated.

In response to determining that the data associated with the address range 218 for the PIM command 210 is currently stored in the cache system 110 prior to initiation of the PIM command 210 (e.g., in response to the cache directory lookup 212 returning a "hit" for one or more data elements in the address range), the asynchronous flush controller 126 transmits a clean command 216 for the address range 218 to the cache system 110. In implementations, the asynchronous flush controller 126 is informed that the data involved in executing the PIM command 210 is likely to be stored in the cache system 110 upon issuance of the PIM command 210 (e.g., by the core 108 to the memory controller 120) based on explicit (e.g., programmer-specified) hints in code executed as part of performing the computational task, based on compiler analysis of the code executed as part of performing the computational task, or combinations thereof, which cause issuance of the ARF command 214 to the asynchronous flush controller 126.

The core 108 schedules the ARF command 214 for a PIM command 210 by placing the ARF command 214 at an appropriate location in program binary for the computational task represented by the memory requests 208. For instance, the core 108 schedules the ARF command 214 at a sufficient time prior to initiation of the PIM command 210, such that the cache system 110 has adequate time to flush the data associated with the address range 218 to memory 116 before initiation of the PIM command 210. In a similar manner, the core 108 refrains from scheduling the ARF command 214 too early. For instance, the core 108 refrains from scheduling the ARF command 214 at a time where subsequent non-processing-in-memory commands in the memory requests 208 would return the data flushed by the ARF command 214 (e.g., via issuance of the clean command 216 by the asynchronous flush controller) to the cache system 110 (e.g., due to modifications to the data by the core 108, due to predictive prefetching, combinations thereof, and so forth).

In some implementations, in response to an ARF command 214, the asynchronous flush controller 126 generates the clean command to selectively skip one or more portions of data involved in executing the PIM command 210. For instance, in implementations where the PIM command 210 involves an array of data having a threshold number of data elements, the asynchronous flush controller 126 identifies that the cache system 110 is of a size that is unable to concurrently store the threshold number of data elements included in the array of data. Because arrays of data are generally accessed in a sequential manner and the cache system 110 may be unable to store an entirety of the array of data at a given time, the core 108 and/or the asynchronous flush controller 126 identifies that the beginning of the array is unlikely to be maintained at the cache system 110 upon initiation of the PIM command 210.

Accordingly, the asynchronous flush controller 126 skips checking for the beginning of the array (e.g., does not perform cache directory lookups 212 for a threshold number of data elements representing the beginning of the array) and instead specifies a starting address of the address range 218 for the clean command 216 that is a portion of the way though the array. In some implementations, this avoidance of performing cache directory lookups 212 for the threshold number of data elements representing the beginning of the array is caused by the core 108, which generates the ARF command 214 to exclude the beginning of the array from the address range 218 included in the ARF command. The precise location at which the address range 218 for the ARF command 214 begins for such an array is dependent on a size of the cache system 110 as well as a size of the data array involved in executing the PIM command 210.

Alternatively or additionally, in some implementations the asynchronous flush controller 126 skips checking for data associated with a portion of an address range 218 for the PIM command 210 in response to cache directory lookups 212 indicating that a threshold number of successive data elements in the address range are not in the cache system 110. For instance, rather than performing a cache directory lookup 212 for every single data element included in an address range for the PIM command 210, the asynchronous flush controller 126 skips ahead in the address range after a threshold number of successive data element cache misses and continues performing cache directory lookups 212 for subsequent data elements in the address range. In implementations where a data element searched via a cache directory lookup 212 after skipping ahead results in a cache hit, the asynchronous flush controller 126 performs a cache directory lookup 212 for at least a portion of the skipped data elements to ensure that no data elements are overlooked for the PIM command 210. The address range 218 included in the clean command 216 is thus generated to specify only data elements that returned a cache hit (e.g., only flushes data elements that are stored in the cache system 110). By skipping ahead in such implementations, the asynchronous flush controller 126 avoids delay associated with performing a cache directory lookup 212 for every single data element included in an address range for the PIM command 210, enabling earlier flushing of data elements involved in executing the PIM command 210 and avoiding stalling the PIM command 210.

Alternatively or additionally, in implementations where the PIM command 210 involves a large address range of data elements, the core 108, or origin from which the ARF command 214 is received, is configured to subdivide the large address range into smaller address ranges and generate separate ARF commands 214 for each of the subdivided address ranges. By segmenting a large address range into smaller address ranges, the originator of the ARF command 214 (e.g., the core 108) avoids scenarios where the PIM command 210 is stalled while waiting for the cache system 110 to flush the large address range of data elements to memory 116.

Figure 3:
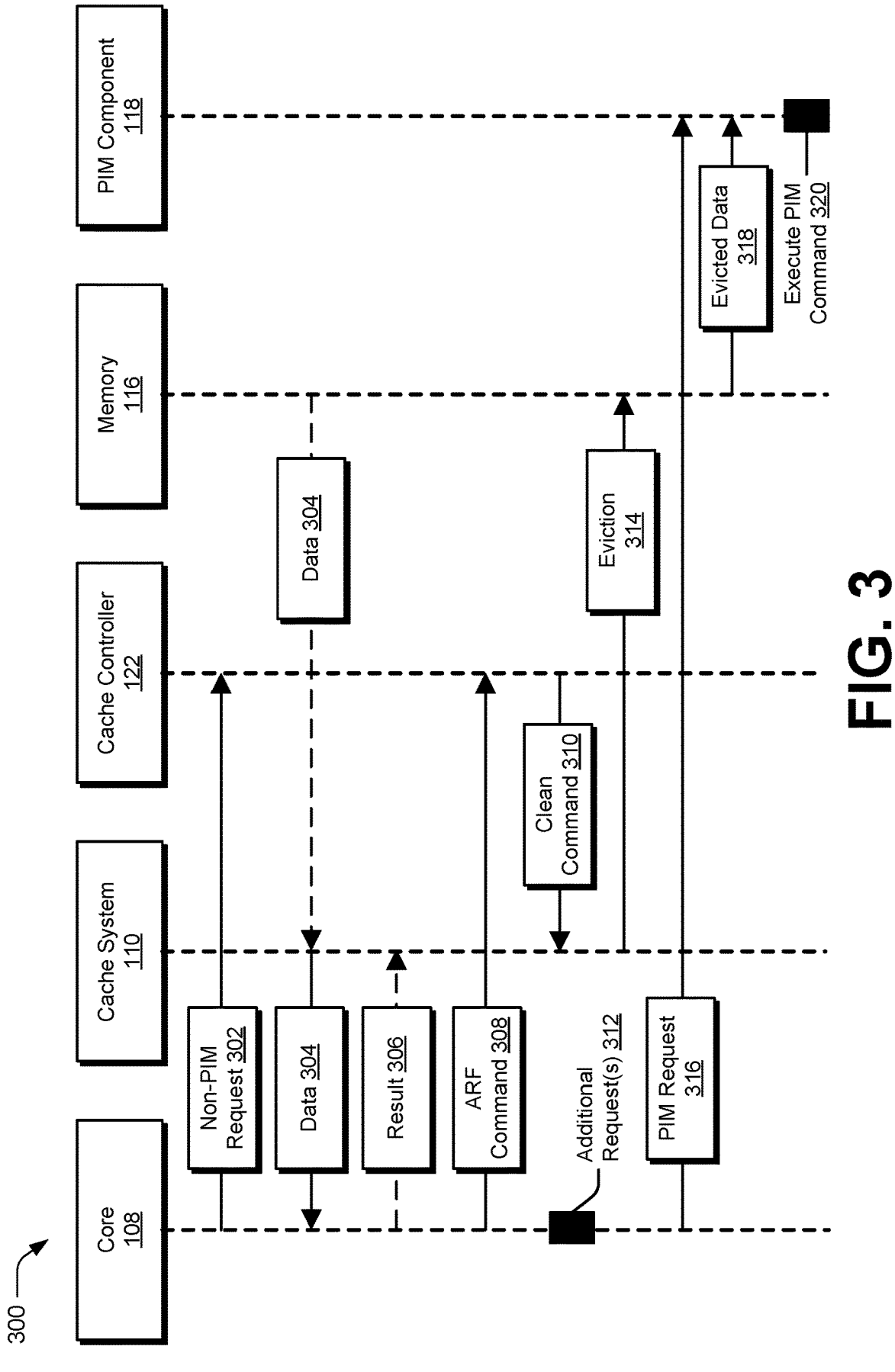
FIG. 3 is a block diagram of a non-limiting example system showing operation of a cache controller of FIG. 1 in greater detail as flushing data from a cache system, for use by a processing-in-memory component as part of executing a processing-in-memory request, prior to issuance of the processing-in-memory request.
Figure 5:
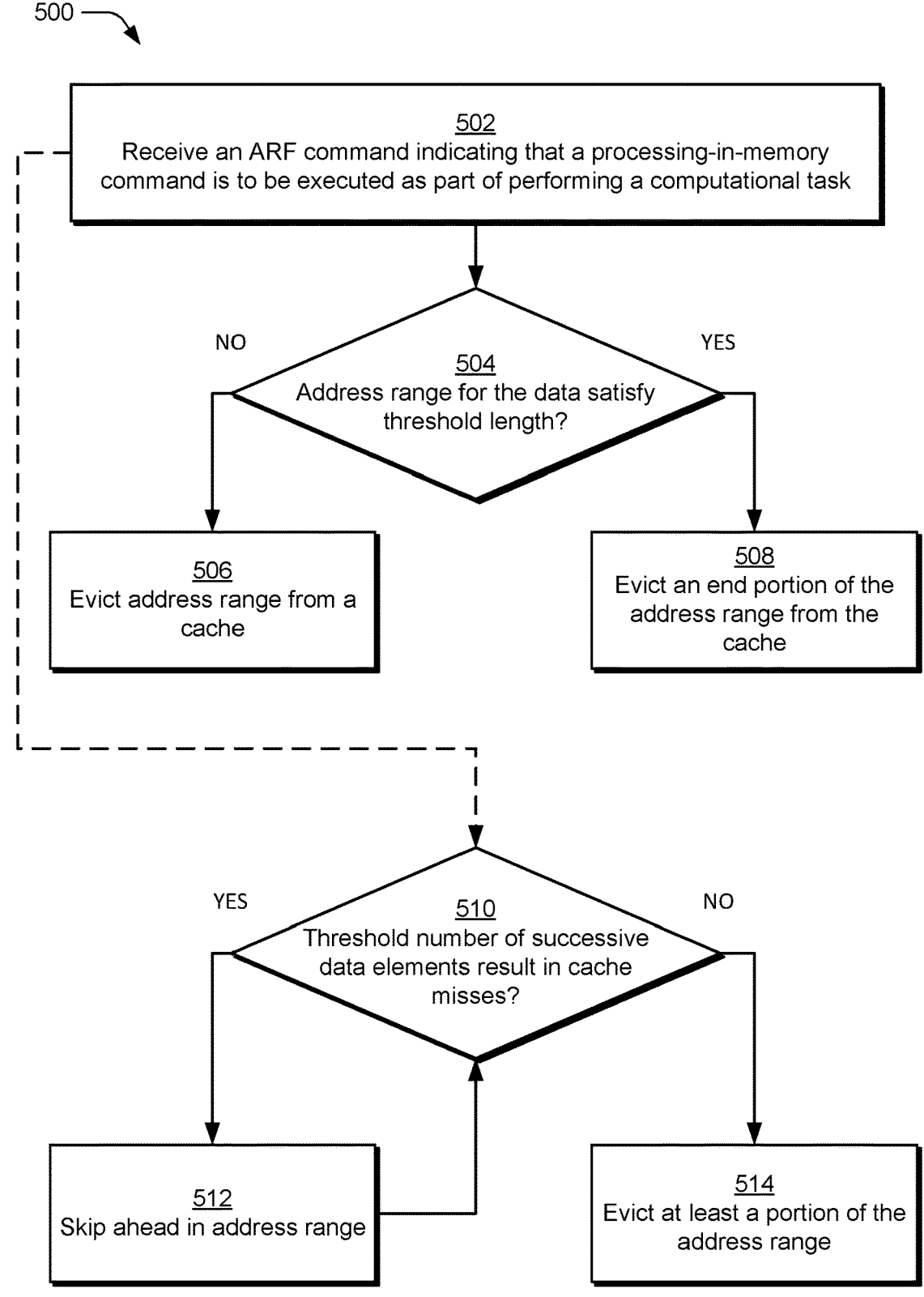
FIG. 5 is a block diagram of a non-limiting example procedure describing performance of selectively flushing cached data in response to an asynchronous range flush command.

In the following description, operation of the example system depicted in FIG. 3 is described in parallel to the procedures depicted in FIGS. 4 and 5. FIG. 4 is a block diagram of a non-limiting example procedure 400 of a step-wise algorithm that provides structure for describing performance of preemptively flushing data from a cache system, for subsequent use by a processing-in-memory component, using an asynchronous range flush command. FIG. 5 a block diagram of a non-limiting example procedure 500 a stepwise algorithm that provides structure for describing performance of selectively flushing cached data, during the process of executing an asynchronous range flush command, for subsequent use by a processing-in-memory component.

FIG. 3 is a block diagram of a non-limiting example system 300 that includes the core 108, the cache system 110, the cache controller 122, the memory 116, and the processing-in-memory component 118. A memory request identifying a memory address is received (block 402). The cache controller 122, for instance, receives a non-processing-in-memory request 302 as part of the memory requests 208 for a computational task. The non-processing-in-memory request 302 represents a request for data 304, from the core 108, for the core to access and/or modify as part of executing one or more operations for the computational task.

In response to receiving the memory request, data associated with the memory request is stored in a cache (block 404). The cache controller 122, for instance, causes the data 304 to be written from the memory 116 to the cache system 110 for access by the core 108 during execution of the non-processing-in-memory request 302. In some implementations, writing the data 304 to the cache system 110 is optional, as indicated by the dashed arrow representing movement of the data 304 from the memory 116 to the cache system 110 (e.g., in implementations where the data 304 is already stored in the cache system 110 upon receipt of the non-processing-in-memory request 302).

In some implementations, executing the non-processing-in-memory request 302 includes generating a result 306 based on processing the data 304. In such implementations where a result 306 is generated, executing the non-processing-in-memory request 302 includes updating the data 304 in the cache system 110 with the result 306 (e.g., modifying one or more data elements of an address range represented by the data 304 with the result 306). An ARF command indicating that a processing-in-memory operation is to be subsequently executed as part of performing the computational task is then received (block 406; block 502). The asynchronous flush controller 126, for instance, receives an ARF command 308 from the core 108, which indicates that the computational task subsequently includes a PIM command 210 that involves processing the data 304 and/or the result 306. The ARF command 308 is thus representative of an instance of the ARF command 214, which includes an address range 218 for data elements to be evicted from the cache system 110 for a PIM command 210.

A cache directory lookup is then performed based on at least one memory address associated with the processing-in-memory operation (block 408). The asynchronous flush controller 126, for instance, performs a cache directory lookup 212 for one or more data elements associated with an address range involved in executing the PIM command 210, such as an address range 218 specified by the ARF command 214. In response to identifying that the one or more data elements associated with the address range involved in executing the PIM command 210 are stored in the cache system 110, or are likely to be stored in the cache system 110 upon initiation of the PIM command 210, data associated with the processing-in-memory operation is evicted from the cache (block 410). The cache controller 122, for instance, transmits the clean command 310 to the cache system 110. The clean command 310 is representative of an instance of the clean command 216, which includes an address range 218 for data elements to be evicted from the cache system 110 and an instruction 220 to either invalidate or "flush and invalidate" the data elements to the memory 116 for subsequent access by the processing-in-memory component 118.

Advantageously, the cache controller 122 is configured to perform the corresponding cache directory lookup(s) 212 and transmit the clean command 310 to the cache system 110 while one or more additional requests 312 are initiated or executed by the core 108. For instance, the one or more additional requests 312 are representative of at least one processing-in-memory request, at least one non-processing-in-memory request, or combinations thereof, that are performed as part of executing the computational task, concurrently while the cache controller 122 generates and/or transmits the clean command 310. The clean command 310 causes the cache system 110 to flush the data elements specified by the address range in the ARF command 308, represented as eviction 314 in the illustrated example of FIG. 3. Advantageously, the eviction 314 occurs concurrently with performance of the one or more additional requests 312.

In some implementations, the eviction 314 represents only a portion of data elements involved in executing a processing-in-memory request 316, which is representative of a PIM command 210. For instance, in some implementations the core 108 determines whether an address range for the processing-in-memory request 316 satisfies a threshold length (block 504). The core 108, for instance, determines whether a data array involved with executing the processing-in-memory request 316 exceeds a storage size of the cache system 110. In response to determining that the address range for the data does not satisfy a threshold length (e.g., a "No" determination at block 504), data elements of the address range are evicted from a cache (block 506).

The core 108, for instance, identifies that the address range is able to be stored by the cache system 110 in its entirety and generates the ARF command 308 to cause eviction 314 of all data elements in the address range from the cache system 110. Alternatively or additionally, the asynchronous flush controller 126 identifies that the address range is able to be stored by the cache system 110 in its entirety and generates the clean command 310 to cause eviction 314 of all data elements in the address range from the cache system 110.

Alternatively, in response to determining that the address range for the data satisfies the threshold length (e.g., a "Yes" determination at block 504), an end portion of data elements included in the address range are evicted from the cache (block 508). The core 108, for instance, identifies that a beginning portion of data elements in the address range are likely to have been previously evicted to make room for an end portion of data elements in the cache system 110 and generates the ARF command 308 to cause eviction 314 of the end portion of the data elements for the address range. Alternatively or additionally, the asynchronous flush controller 126 identifies that the beginning portion of data elements in the address range are likely to have been previously evicted to make room for an end portion of data elements in the cache system 110 and generates the clean command 310 to cause eviction 314 of the end portion of the data elements for the address range. In implementations, a size of the end portion of the address range (e.g., a number of data elements included in the end portion of the address range) is determined based on a length of the address range and a size of the cache system 110.

Alternatively or additionally, in some implementations the asynchronous flush controller 126 determines whether a threshold number of successive data elements for the processing-in-memory request 316 result in cache misses (block 510). The asynchronous flush controller 126, for instance, begins conducting cache directory lookups 212 for data elements involved in executing the processing-in-memory request 316. In response to identifying that the threshold number of successive data element cache directory lookups 212 return misses (e.g., a "Yes" determination at block 510), the asynchronous flush controller 126 skips ahead in the address range by a threshold amount of data elements (block 512). Operation of the non-limiting example procedure 500 then returns to block 510 to continue performing cache directory lookup 212 for data elements in the address range.

In response to identifying that the threshold number of successive data elements do not result in cache misses (e.g., a "No" determination at block 510), at least a portion of data elements for the address range are evicted from the cache system (block 514). For instance, in response to identifying that cache hits occur for data elements involved in executing the processing-in-memory request 316, the asynchronous flush controller 126 generates clean command 310 to include the cache hit data elements in the address range 218 and causes eviction 314 of the data elements from the cache system 110 to the memory 116.

After causing eviction 314 of one or more data elements involved in executing the processing-in-memory request 316 (e.g., via the ARF command 308 and the clean command 310), a request to execute the processing-in-memory operation is received (block 412). The memory controller 120, for instance, receives the processing-in-memory request 316 from the core 108. Alternatively, in some implementations the processing-in-memory request 316 is transmitted directly from the core 108 to the processing-in-memory component 118. The processing-in-memory operation is then executed using a processing-in-memory component (block 414). The processing-in-memory component 118, for instance, obtains evicted data 318 from the memory 116 (e.g., data flushed from the cache system 110 to the memory 116 via the eviction 314) and executes at least one processing-in-memory command included in the processing-in-memory request 316 (block 320). Advantageously, the techniques described herein generate the ARF command 308 and cause eviction 314 of one or more data elements involved in completing the processing-in-memory request 316 prior to issuance of the processing-in-memory request 316 by the core 108, thus avoiding delay and other computational shortcomings encountered by conventional systems.

It should be understood that many variations are possible based on the disclosure herein. Although features and elements are described above in particular combinations, each feature or element is usable alone without the other features and elements or in various combinations with or without other features and elements.

The various functional units illustrated in the figures and/or described herein (including, where appropriate, the device 102 having the core 108 and the memory module 106 having the memory 116 and the processing-in-memory component 118) are implemented in any of a variety of different manners such as hardware circuitry, software or firmware executing on a programmable processor, or any combination of two or more of hardware, software, and firmware. The methods provided are implemented in any of a variety of devices, such as a general-purpose computer, a processor, or a processor core. Suitable processors include, by way of example, a general purpose processor, a special purpose processor, a conventional processor, a digital signal processor (DSP), a graphics processing unit (GPU), a parallel accelerated processor, a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine.

In one or more implementations, the methods and procedures provided herein are implemented in a computer program, software, or firmware incorporated in a non-transitory computer-readable storage medium for execution by a general-purpose computer or a processor. Examples of non-transitory computer-readable storage mediums include a read only memory (ROM), a random-access memory (RAM), a register, cache memory, semiconductor memory devices, magnetic media such as internal hard disks and removable disks, magneto-optical media, and optical media such as CD-ROM disks, and digital versatile disks (DVDs).

Although the systems and techniques have been described in language specific to structural features and/or methodological acts, it is to be understood that the systems and techniques defined in the appended claims are not necessarily limited to the specific features or acts described. Rather, the specific features and acts are disclosed as example forms of implementing the claimed subject matter.

The invention claimed is:

1. A system comprising:
a cache system including a plurality of cache levels; and
a cache controller configured to:
identify that a processing-in-memory command involves a plurality of data elements stored at an address range in the cache system; and
responsive to the address range satisfying a threshold size, evict a portion of the plurality of data elements from the cache system prior to issuance of the processing-in-memory command, the evicted portion of the plurality of data elements excluding some of the plurality of data elements.

2. The system of claim 1, wherein the processing-in-memory command is associated with a computational task, and wherein the cache controller is configured to identify that the processing-in-memory command involves the plurality of data elements stored at the address range in the cache system based on code for the computational task including a non-processing-in-memory command that modifies at least one of the plurality of data elements prior to issuance of the processing-in-memory command.

3. The system of claim 1, wherein the cache controller is configured to evict the portion of the plurality of data elements from the cache system by transmitting a clean command to the cache system that specifies a portion of the address range including the portion of the plurality of data elements and an instruction to flush the portion of the plurality of data elements to memory of the system or invalidate the portion of the plurality of data elements in the cache system.

4. The system of claim 3, wherein the processing-in-memory command is associated with a computational task, and wherein the cache controller generates the clean command by performing a cache directory lookup for the portion of the plurality of data elements during execution of one or more different commands involved in performing the computational task.

5. The system of claim 4, wherein the cache controller generates the portion of the address range of the clean command based on one or more cache hit responses to the cache directory lookup.

6. The system of claim 4, wherein the cache controller performs the cache directory lookup by skipping a beginning portion of the plurality of data elements based on the address range in the cache system satisfying the threshold size.

7. The system of claim 6, wherein the threshold size for the address range in the cache system is based on a storage size of the cache system.

8. The system of claim 4, wherein the cache controller performs the cache directory lookup by skipping a threshold number of the plurality of data elements based on the cache directory lookup returning a number of successive cache misses.

9. The system of claim 3, wherein the processing-in-memory command is associated with a computational task, and wherein the cache controller transmits the clean command during execution of one or more different commands involved in performing the computational task.

22

10. A device comprising:
a cache controller configured to:
receive an indication that a processing-in-memory command to be subsequently executed involves a plurality of data elements;
perform a cache directory lookup to determine whether the plurality of data elements are stored at an address range in a cache system; and
responsive to the address range satisfying a threshold size, evict a portion of the plurality of data elements from the cache system prior to issuance of the processing-in-memory command, the evicted portion of the plurality of data elements excluding some of the plurality of data elements.

11. The device of claim 10, wherein the cache controller evicts the portion of the plurality of data elements from the cache system by transmitting a clean command to the cache system that specifies a portion of the address range including the plurality of data elements and an instruction to flush the portion of the plurality of data elements to memory or invalidate the portion of the plurality of data elements in the cache system.

12. The device of claim 11, wherein the cache controller performs the cache directory lookup by skipping a beginning portion of the plurality of data elements included in the address range in response to the address range satisfying the threshold size.

13. The device of claim 12, wherein the threshold size for the address range is based on a storage size of the cache system.

14. The device of claim 11, wherein the processing-in-memory command is associated with a computational task, and wherein the cache controller generates the clean command by performing a cache directory lookup for the portion of the plurality of data elements included in the address range during execution of one or more different commands involved in performing the computational task.

15. The device of claim 14, wherein the cache controller generates the portion of the address range specified by the clean command based on one or more cache hit responses to the cache directory lookup.

16. The device of claim 11, wherein the cache controller performs the cache directory lookup by skipping a threshold number of the plurality of data elements based on the cache directory lookup returning a number of successive cache misses.

17. The device of claim 11, wherein the processing-in-memory command is associated with a computational task, and wherein the cache controller transmits the clean command during execution of one or more different commands involved in performing the computational task.

18. The device of claim 11, wherein the processing-in-memory command is associated with a computational task, and wherein the indication that the processing-in-memory command involves the plurality of data elements stored in the cache system is generated based on code for the computational task including a non-processing-in-memory command that modifies at least one of the plurality of data elements prior to issuance of the processing-in-memory command.

19. A method comprising:
executing, by a core of a processing unit, a plurality of commands as part of performing a computational task;
identifying that the plurality of commands include a processing-in-memory instruction that accesses a plurality of data elements stored at an address range in a cache system during performance of the computational task;

identifying that the address range satisfies a threshold size;

responsive to the address range satisfying the threshold size, and while the core of the processing unit is executing a portion of the plurality of commands that occur prior to the processing-in-memory instruction, evicting a portion of the plurality of data elements from the cache system, the portion of the plurality of data elements excluding at least one of the plurality of data elements; and transmitting, by the core of the processing unit, the processing-in-memory instruction to a processing-in-memory component after the portion of the plurality of data elements is evicted from the cache system.

20. The method of claim 19, wherein evicting the portion of the plurality of data elements is performed without evicting all of the plurality of data elements from the cache system.

* * * * *